May 14, 1946.  J. H. CONE  2,400,340
PROCESS FOR SEPARATING OLEFINS FROM A HYDROCARBON STREAM
Filed Dec. 1, 1944
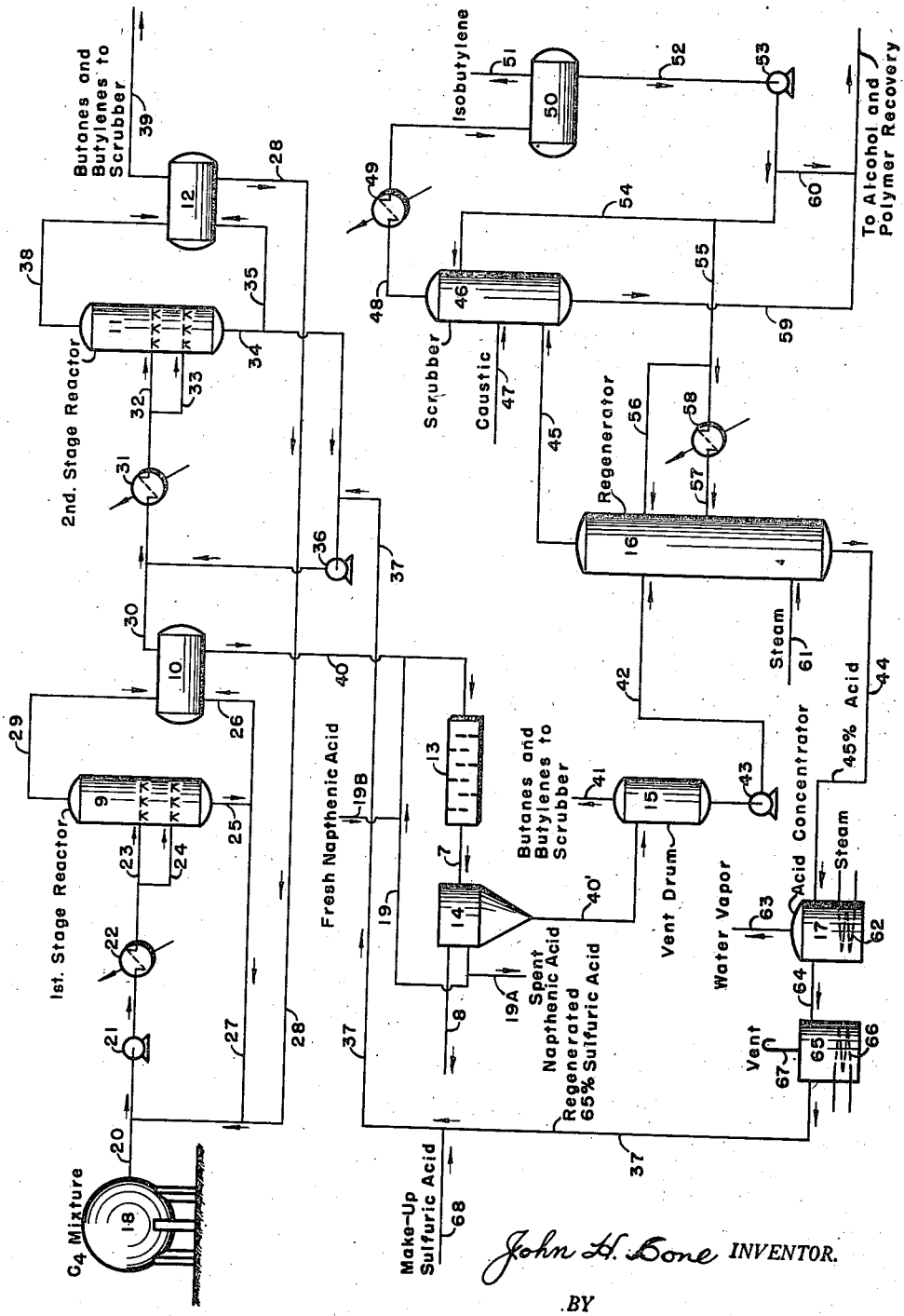
John H. Cone INVENTOR.
BY
J D McKean
ATTORNEY.

UNITED STATES PATENT OFFICE 2,400,340

PROCESS FOR SEPARATING OLEFINS FROM A HYDROCARBON STREAM

John Hill Cone, Goose Creek, Tex., assignor to Standard Oil Development Company, a corporation of Delaware Application December 1, 1944, Serial No. 566,102

5 Claims. (Cl. 260—677)

The present invention is directed to a method for concentrating relatively weak sulfuric acid which previously has been employed for treating hydrocarbons.

More particularly, the present invention is directed to a process wherein low molecular weight hydrocarbons, including olefins, are treated with sulfuric acid to form an extract, the absorbed and reacted hydrocarbons recovered from the extract and the recovered acid concentrated, and involving the washing of the extract with naphthenic acids, salts thereof, or oils containing appreciable amounts of naphthenic acids to remove foam producing agents from the extract.

It is conventional to the art to recover low molecular weight olefins from a hydrocarbon mixture by contacting the mixture with sulfuric acid. As an example of a typical operation, a hydrocarbon feed stock, including iso and normal butane, isobutylene and normal butylene, may be brought into contact with 65% sulfuric acid in a reaction zone under a pressure substantially in excess of atmospheric in order to form an extract. The pressure on this extract is reduced to substantially atmospheric in a vent drum with the resultant release of the butanes and normal butylenes previously absorbed therein. The extract is then sent to a regenerator where polymers and alcohols resulting from the reaction of the sulfuric acid with the hydrocarbon mixture are separated as overhead fractions and the acid is concentrated to a 45% strength. The acid is removed from the regenerator to an acid concentrator where its strength is increased to 65% and then returned to the reaction zone of the system. In conventional operations, substantial foaming is encountered in the vent drum, the regenerator and in the acid concentrator and this foaming requires these portions of the system to be operated at a rate below that which may be employed when foaming is eliminated.

In accordance with the present invention, foaming in the vent drum, regenerator and acid concentrator is eliminated or greatly reduced by washing the extract with a naphthenic acid or a mixture of naphthenic acids. The washing step removes foaming agents from the sulfuric acid extract and allows the extract to be sent through the vent drum, regenerator and acid concentrator with little or no foaming.

Naphthenic acids are well-known commercial products. The best known source of naphthenic acids is petroleum, particularly petroleum produced from such sections as the Gulf Coast and California fields, and a number of methods are well-known for recovering the naphthenic acids from petroleum. The present invention may conveniently be practiced by employing a mixture of naphthenic acids recovered from petroleum by any of the conventional methods or, if desired, by using a purified naphthenic acid fraction obtained by subjecting the mixture of crude naphthenic acid obtained from a petroleum fraction to a purification process which may include solvent extraction or distillation.

In accordance with the present invention, the sulfuric acid extract obtained by contacting the hydrocarbon mixture with sulfuric acid is washed with a naphthenic acid or a mixture of naphthenic acids to remove foam producing agents therefrom prior to the several steps employed for recovering the hydrocarbons from the sulfuric acid extract and for reconcentrating the sulfuric acid. The step of washing the sulfuric acid extract with the naphthenic acid or naphthenic acid mixture may be conducted either as a batch process or as a continuous process, and the amount of naphthenic acid or naphthenic acid mixture employed may be varied over a wide range. It will be found convenient to wash the sulfuric acid extract with an amount of naphthenic acid or naphthenic acid mixture in the range of 1 to 20 volume per cent. If desired, a charge of naphthenic acid or naphthenic acid mixture may be used a number of times for washing sulfuric acid extract. In order to co-ordinate the present invention with commercial refinery operations where continuous processes are employed wherever possible, it will usually be desirable to conduct the process of the present invention as a continuous operation and recycle continuously the naphthenic acid or mixture of naphthenic acids used to wash the sulfuric acid extract. The naphthenic acid or naphthenic acid mixture employed for the washing step may be circulated a number of times through the washing step and then replaced by a new batch or, alternatively, a small portion of fresh naphthenic acid or naphthenic acid mixture added thereto and an equal portion of used naphthenic acid or naphthenic acid mixture removed therefrom continuously.

The invention will now be described in greater detail in conjunction with the drawing in which the single figure is in the form of a flow sheet illustrating a preferred modification of the present invention.

In the drawing is shown a first stage reactor 9, a first stage settling drum 10, a second stage reactor 11, a second stage settling drum 12, a mixing device 13, a settling vessel 14, a vent drum 15, a regenerator vessel 16 and an acid concentrator vessel 17. The mixture of said hydrocarbons is passed to the system from a storage vessel 18.

The system shown in the drawing may be described generally as involving a reaction zone, an acid regenerator zone, and an acid concentrating zone. The reaction or absorption zone is divided into two stages, with hydrocarbons flowing through the first and second stages in sequence and sulfuric acid passed into the second stage and forming an extract therein, the extract taken from the second stage and enriched in the first stage and the enriched extract from the first stage washed with naphthenic acid or a mixture of naphthenic acids and then sent through acid regeneration and acid concentration zones. The hydrocarbon stream passes through first stage reactor 9 and then through second stage reactor 11. Regenerated acid is fed into second stage reactor 11 and forms an extract therein and this extract is fed to first stage 9 to serve as the absoption liquid therein. The enriched extract passes from reactor 9 to settling vessel 10 and is taken from settling vessel 10 through mixer 13, settling vessel 14, vent drum 15, regenerator 16 and acid concentrator 17 where the acid is restored to its original condition and returned to second stage reactor vessel 11. The vent drum 15 is arranged between settling vessel 10 and regenerator tower 16 in order to allow the release of pressure from the extract before it is sent to the regenerator tower.

In order to eliminate foaming of the acid in vent drum 15, regenerator 16 and acid concentrator 17, the extract is washed to remove foaming agents therefrom. The extract is washed with naphthenic acid or a naphthenic acid mixture which is added to the extract by a line 19, mixes therewith in mixing device 13 and subsequently removed from the extract by settling in settling vessel 14. The naphthenic acid separated from the extract in settling vessel 14 may be recirculated through line 19 and used for treating additional extract. It will be understood that the naphthenic acid or naphthenic acid mixture removes foaming agents from the extract and in order to maintain the efficiency of the naphthenic acid or naphthenic acid mixture, it is desirable to remove used naphthenic acid from the system and add fresh naphthenic acid thereto. The used naphthenic acid may be removed by outlet 19A and fresh naphthenic acid may be added via inlet 19B to the stream of naphthenic acid being circulated through line 19.

When the naphthenic acid or naphthenic acid mixture is added to the sulfuric acid extract and allowed to settle, three layers are formed. The heavier layer is the washed acid extract which may be withdrawn for the recovery of hydrocarbons therefrom and regeneration of the acid. The middle layer comprises naphthenic acid and carbonaceous material and the top layer comprises naphthenic acid and oil when an oil containing naphthenic acids is employed as the washing medium. In the drawing, the two top layers may be withdrawn from the settling vessel via line 19 and recycled. At times it may be desirable to withdraw the oil layer from the system and when operating in accordance with such a procedure, the top oil layer may be withdrawn from settling vessel 14 via outlet 8.

As a typical example, the hydrocarbon feed stock in vessel 18 may consist of 50% of iso and normal butane, 32% normal butylenes and 18% isobutylene. This hydrocarbon mixture is passed from vessel 18 via line 20 in which is arranged pump 21 and heat exchanger 22 and discharges through distributing lines 23 and 24 into first stage reactor vessel 9. The liquid from the bottom of reactor vessel 9 is withdrawn through line 25 and the stream split, with a portion passing through line 26 to first stage settling drum 10 and the remainder being recycled to line 20 via line 27. To the extract flowing through line 27 is added extract withdrawn from the second stage settling drum 12 by line 28 and the resultant mixture is discharged into the hydrocarbon stream in line 20.

It is convenient to operate first stage reactor vessel 9 at a temperature of 100° F. and at a pressure of 140 pounds per square inch. The admixture of the extract comprising sulfuric acid with the hydrocarbon feed stock in line 20 usually results in such a rise in temperature that it is necessary to cool the mixture with heat exchanger 22 in order to maintain the temperature in reactor vessel 9 at approximately 100° F. The hydrocarbon vapors in first stage reactor vessel 9 which are not absorbed or reacted with the sulfuric acid extract therein are removed as overhead via line 29 and discharged into the upper portion of first stage settling drum 10. The unabsorbed hydrocarbons from first stage settling drum 10 are passed through line 30 containing heat exchanger 31 and through lines 32 and 33 into second stage reactor vessel 11. Extract from the lower portion of second stage reactor vessel 11 is withdrawn via line 34 and the stream split, with a portion passing through line 35 to second stage settling drum 12 and the remainder passing through pump 36 and discharging into the hydrocarbon stream passing through line 30. Regenerated sulfuric acid is discharged into stream 34 through line 37.

Unabsorbed and unreacted hydrocarbon vapors from second stage reactor vessel 11 pass through line 38 to second stage settling vessel 12 and the unreacted and unabsorbed hydrocarbons from vessel 12 comprising principally iso and normal butane and normal butylenes are withdrawn from outlet line 39. It is convenient to operate second stage reactor vessel 11 at a temperature of 70° F. and under a pressure of 135 pounds per square inch and in order to maintain these temperature and pressure conditions in vessel 11 it will usually be necessary to employ a cooling medium in heat exchanger 31 in order to remove heat resulting from the mixing of hydrocarbons with sulfuric acid in line 30.

With a pressure in first stage reactor vessel 9 of approximately 140 pounds per square inch and in second stage reactor vessel 11 at approximately 135 pounds per square inch the pressure in first stage settling drum 10 is approximately 135 pounds per square inch. In order to recover hydrocarbons from the extract in settling vessel 10 and regenerate the sulfuric acid used as the extracting agent, it is desirable to release the pressure on the extract and subsequently subject the extract to a heating operation. In order to eliminate foaming in the portion of the system employed for the recovery of hydrocarbons and regeneration of the sulfuric acid, the sulfuric acid extract is washed with a naphthenic acid or a mixture of naphthenic acids before reducing the pressure thereon.

In the drawing, the extract from vessel 10 is withdrawn through line 40 and naphthenic acid added thereto by line 19 and an intimate mixture of the extract and naphthenic acid is obtained by passing these components through mixing device 13. The mixture passes from mixing device 13 through line 7 to settling vessel 14. In vessel 14, the upper two layers containing naphthenic acid may be withdrawn via line 19 or via lines 19 and 8, as previously described while the sulfuric acid extract is withdrawn through line 40'. The sulfuric acid extract passes through line 40' to vent drum 15 where the pressure on the extract is released to atmospheric by line 41.

Extract is withdrawn from vent drum 15 via line 42 and pump 43 and discharged into regenerator tower 16. Hydrocarbons in vaporous condition are removed from tower 16 as overhead via outlet 45 and passed into scrubber 46 where they are brought into contact with caustic introduced into the scrubber through inlet 47. The vapors from scrubber 46 are removed through outlet 48 and passed through cooler 49 to condense the high boiling constituents and the cooled mixture is discharged into accumulator 50. Uncondensed materials, principally isobutylene, are removed in gaseous form from the upper portion of accumulator 50 through outlet 51. Condensate is removed from vessel 50 through line 52 containing pump 53 and the stream split; a portion being passed through line 54 to serve as a scrubbing material in tower 46, another portion passing through line 55 and again divided with one part discharged through line 56 into an upper part of regenerator tower 16 and the remainder passing through line 57 containing heater 58 and into regenerator 16 some distance below the point of discharge of line 56. Liquid is withdrawn from the bottom of scrubber 46 through line 59 and has added thereto condensate withdrawn from vessel 50 via line 52, pump 53 and branch line 60. The liquid mixture in line 59 includes alcohol and polymer and is withdrawn from the system to a suitable arrangement for recovering these valuable products.

It is desirable to operate regenerator tower 16 with a bottom temperature of approximately 240° F. and a top temperature of 160° F. In addition to the heat added to the tower by heat exchanger 58, steam may be injected into the bottom of the tower through inlet 61.

Acid is withdrawn from the bottom of the regenerator tower 16 at a concentration of approximately 45% and is passed via line 44 to acid concentrator 17. In this vessel the acid is heated by steam passing through coil 62 and the water vapor driven from the acid is discharged through outlet 63. In concentrator vessel 17 the acid is concentrated to a strength of approximately 65% and is discharged through line 64 to vessel 65 containing cooling coil 66 and vent 67. The acid accumulated in vessel 65 is regenerated acid and is passed through lines 37 and 34 to the hydrocarbon stream passing through line 30 to second stage reactor vessel 11. In order to replace the acid lost in the operation makeup acid may be introduced through inlet line 68 to the stream of regenerated acid.

When operating the reactor vessels 9 and 11 at temperatures and pressures of 100° F. and 140 pounds per square inch, respectively, and with a feed stock having the composition given above, it will be found that good results may be obtained when withdrawing 235 gallons of feed per minute from vessel 18 and passing 1360 gallons of regenerated acid per minute through line 37 and into the hydrocarbon stream being passed to the second stage reactor vessel 11.

Advantages obtained by the practice of the present invention will be further illustrated by the following example.

*Example*

Sulfuric acid of 65% concentration which had been employed in the extraction process for the concentration of isobutylene was tested for its foaming characteristics. Upon passing a stream of air at a rate of 0.038 cubic feet per minute through a 100 cc. sample of the acid it was found that the height of the resulting foam was 87 mm./minute. After the flow of air through the sample was terminated, 10.5 seconds was required for the foam to break.

A sample of the sulfuric acid above tested was washed with a mixture of crude naphthenic acids obtained from Gulf Coast gas oil in the amount of 3.3 volume per cent of naphthenic acids. The washed sulfuric acid was blown with air at the rate of 0.040 cubic foot per minute per 100 cc. of sample. The height of the foam of the washed sample was 4 mm./minute and the time required for the foam to break after the flow of air was terminated was 0.1 second.

It is to be understood that the above example is given by way of illustration and not by way of limitation of the present invention. While 3.3 volume per cent of crude naphthenic acid mixture was used in the above example, it will be found that good results may be obtained when naphthenic acid or a naphthenic acid mixture is used in the range of 1 to 20 volume per cent of naphthenic acid or naphthenic acid mixture for washing the sulfuric acid extract.

Having fully described the present invention, what I desire to claim is:

1. A process for separating olefins from a predominately $C_4$ hydrocarbon feed stock comprising olefins including the steps of contacting the feed stock with sulfuric acid in a reaction zone under conditions to form an extract, washing said extract with naphthenic acid in a washing zone under conditions to remove foaming agents therefrom, subsequently heating the washed extract and reducing the pressure therein to cause the vaporization of a major portion of the hydrocarbons from said extract.

2. A process in accordance with claim 1 in which the extract is washed with naphthenic acid in the range of 1 to 20 volume per cent.

3. A process in accordance with claim 1 in which the sulfuric acid extract is washed with approximately 3 volume per cent of a mixture of naphthenic acids obtained from petroleum.

4. A process for separating olefins from a hydrocarbon stream including a substantial portion of $C_4$ hydrocarbons and appreciable amounts of olefins comprising the steps of contacting the hydrocarbon stream with sulfuric acid of a strength of approximately 65 per cent in a reaction zone under conditions to form an extract, removing the extract from the reaction zone and washing it with naphthenic acid in the range of 1 to 20 volume per cent to remove foam-forming agents from the extract, increasing the temperature and reducing the pressure of the washed extract to cause vaporization of a major portion of the hydrocarbons therein and to form a dilute acid fraction, heating said dilute acid fraction to remove water vapors therefrom and concentrate the acid to a concentration of approximately 65 per cent and recycling the concentrated acid to the reaction zone and contacting it with said hydrocarbon stream.

5. A method in accordance with claim 4 in which the sulfuric acid extract is washed with approximately 3 volume per cent of a naphthenic acid mixture obtained from petroleum.

JOHN HILL CONE.